United States Patent
Morita et al.

(10) Patent No.: US 9,077,836 B1
(45) Date of Patent: Jul. 7, 2015

(54) IMAGE READING APPARATUS

(71) Applicant: BROTHER KOGYO KABUSHIKI KAISHA, Nagoya-shi, Aichi-ken (JP)

(72) Inventors: Kyoichi Morita, Anjo (JP); Isao Kubo, Tokoname (JP); Hidenobu Kondo, Nagoya (JP); Takahiro Ikeno, Seto (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/591,985

(22) Filed: Jan. 8, 2015

(30) Foreign Application Priority Data

Jan. 10, 2014 (JP) ................................. 2014-003411

(51) Int. Cl.
- H04N 1/60 (2006.01)
- H04N 1/46 (2006.01)
- G03F 3/08 (2006.01)
- G06K 9/00 (2006.01)
- H04N 1/00 (2006.01)
- H04N 1/10 (2006.01)

(52) U.S. Cl.
CPC ........ *H04N 1/00798* (2013.01); *H04N 1/00013* (2013.01); *H04N 1/00034* (2013.01); *H04N 1/0005* (2013.01); *H04N 1/00063* (2013.01); *H04N 1/00055* (2013.01); *H04N 1/00082* (2013.01); *H04N 1/10* (2013.01); *H04N 2201/0081* (2013.01)

(58) Field of Classification Search
None
See application file for complete search history.

(56) References Cited

U.S. PATENT DOCUMENTS

| | | | |
|---|---|---|---|
| 5,132,788 A * | 7/1992 | Hirota | 358/517 |
| 5,289,292 A * | 2/1994 | Osada et al. | 358/451 |
| 5,541,736 A * | 7/1996 | Sagara et al. | 358/1.9 |
| 6,134,022 A * | 10/2000 | Yamamoto et al. | 358/1.9 |
| 6,268,929 B1 * | 7/2001 | Ono | 358/1.6 |
| 6,404,448 B1 * | 6/2002 | Toda | 346/116 |
| 6,421,076 B1 * | 7/2002 | Asaya | 347/234 |
| 6,661,545 B2 * | 12/2003 | Sato et al. | 358/509 |
| 6,674,544 B2 * | 1/2004 | Shiota et al. | 358/1.9 |
| 7,075,674 B2 * | 7/2006 | Nagumo et al. | 358/1.16 |
| 7,843,610 B2 * | 11/2010 | Hoshi | 358/474 |
| 8,248,672 B2 * | 8/2012 | Kimura | 358/474 |
| 2001/0021042 A1 * | 9/2001 | Hirota et al. | 358/505 |
| 2002/0044291 A1 * | 4/2002 | Tsuji | 358/1.9 |
| 2002/0080420 A1 | 6/2002 | Yokochi | |
| 2002/0085081 A1 * | 7/2002 | Tanimoto et al. | 347/115 |
| 2004/0062584 A1 * | 4/2004 | Kaji | 400/76 |

(Continued)

FOREIGN PATENT DOCUMENTS

| JP | 2002-176534 A | 6/2002 |
|---|---|---|
| JP | 4201008 B2 | 10/2008 |

(Continued)

*Primary Examiner* — Madelein Nguyen
(74) *Attorney, Agent, or Firm* — Merchant & Gould PC

(57) ABSTRACT

An image reading apparatus includes: a command unit which generates a command signal periodically; a reading unit which reads an original in accordance with the command signal every time the command signal is generated; a conveying unit which conveys at least one of the reading unit and the original so as to change a relative position between the reading unit and the original; a signal output unit which outputs a displacement signal every time the relative position is changed by a predetermined amount corresponding to a reading interval; and a control unit which controls a generation timing of the command signal by the command unit. A generation period of the command signal is less than an output time interval of the displacement signal.

8 Claims, 11 Drawing Sheets

(56) References Cited

U.S. PATENT DOCUMENTS

| | | | |
|---|---|---|---|
| 2006/0268043 A1* | 11/2006 | Akiyama | 347/19 |
| 2007/0002408 A1* | 1/2007 | Ikeno | 358/514 |
| 2007/0195379 A1 | 8/2007 | Suga | |
| 2007/0216962 A1* | 9/2007 | Inage | 358/461 |
| 2007/0285739 A1* | 12/2007 | Nakano et al. | 358/474 |
| 2008/0002237 A1* | 1/2008 | Matsunaga | 358/471 |
| 2008/0056318 A1* | 3/2008 | Kubo | 372/38.07 |
| 2010/0220368 A1* | 9/2010 | Kubo | 358/474 |
| 2011/0242259 A1* | 10/2011 | Kubo | 347/224 |
| 2013/0271518 A1* | 10/2013 | Morita et al. | 347/8 |
| 2015/0042739 A1* | 2/2015 | Seki | 347/118 |

FOREIGN PATENT DOCUMENTS

| | | |
|---|---|---|
| JP | 2009-246636 A | 10/2009 |
| JP | 2012-090204 A | 5/2012 |
| JP | 2012-165227 A | 8/2012 |
| JP | 2013-115579 A | 6/2013 |

\* cited by examiner

IMAGE READING APPARATUS

CROSS REFERENCE TO RELATED APPLICATION

The present application claims priority from Japanese Patent Application No. 2014-003411 filed on Jan. 10, 2014 the disclosure of which is incorporated herein by reference in its entirety.

BACKGROUND

1. Field of the Invention

The present invention relates to an image reading apparatus.

2. Description of the Related Art

There is known a conventional image reading apparatus which conveys an image sensor at an area located below an original so as to read the original. For example, there is known an image recording apparatus which generates a transfer timing signal at a predetermined time interval while conveying the image sensor (see Japanese Patent Application Laid-open No. 2009-246636). The transfer timing signal is a signal for transferring an image signal generated by the image sensor. The image sensor executes a reading operation every time the transfer timing signal is inputted to the image sensor.

It may happen in this image reading apparatus that the transfer timing signal is generated at a deviated position from an appropriate original-reading position (timing) at which the original is to be read, depending on the velocity of the image sensor. Thus, the transfer timing signal is corrected based on the count number of pulse edge of an encoder signal which is generated and outputted in accordance with a rotation of a motor which conveys the image sensor. Specifically, an error between a target control value and the count number indicating the position of the image sensor is detected each time interval corresponding to the generation cycle (generation period) of the transfer timing signal, and in a case that the error exceeds an allowable range, the transfer timing signal is generated at a shifted timing.

SUMMARY

In the conventional technique described above, however, it is necessary that the number of pulse edge of the encoder signal is counted since the reading has started, and that the value of counting is stored as the positional information of the image sensor. Further, in a case that the transfer timing signal is generated at a shifted timing, the control target value needs to be updated.

Namely, in a case of executing a periodic reading operation by inputting a periodic signal to the image sensor in the conventional technique, the correction of the transfer timing signal and the suppression of any lowering in image quality due to the above-described phenomenon, in which the original-reading position is deviated from the appropriate position, cannot be realized without performing any complicated processing such as the storage of counting value as the positional information of the image sensor, updating the control target value, etc.

The present teaching is made in view of such a problem, and an object of the present teaching is to provide a technique capable of efficiently adjusting a generation timing of a reading command signal in an image reading apparatus in which the reading command signal is periodically inputted to a reading unit, such that the original-reading position of the reading unit, that is determined based on the reading command signal, is an appropriate position.

According to an aspect of the present teaching, there is provided an image reading apparatus including: a command unit configured to generate a command signal periodically; a reading unit configured to read an original in a main scanning direction in accordance with the command signal every time the command signal is generated; a conveying unit configured to perform a conveying process for conveying at least one of the reading unit and the original so as to change a relative position between the reading unit and the original in a sub scanning direction; a signal output unit configured to output a displacement signal every time the relative position is changed by a predetermined reading interval; and a control unit configured to control a generation timing at which the command signal is generated by the command unit, wherein a generation period of the command signal is less than an output time interval at which the displacement signal is outputted by the signal output unit in the conveying process, the control unit is configured to determine, with respect to the command signal periodically generated, an elapsed time elapsed from an output timing at which the displacement signal has been outputted by the signal output unit until a generation timing at which the command signal is generated by the command unit after the displacement signal has been outputted, and under a condition that the elapsed time is less than a reference value, the control unit delays generating the command signal until the elapsed time is not less than the reference value.

In the image reading apparatus, the generation period of the command signal is shorter than the output time interval of the displacement signal outputted from the signal output unit, in the conveying process executed by the conveying unit. In a case that the generation period of the command signal is shorter than the output time interval of the displacement signal corresponding to the reading interval, it is possible to cause the reading unit to execute the reading operation at least one time during a period of time (time period) in which the relative position is changed by the amount corresponding to the reading interval. In a case that the reading unit can be made to execute the reading operation a plurality of times during the time period in which the relative position is changed by the amount corresponding to the reading interval, it is possible to determine one image data for each reading interval as a valid data from the plural line image data generated by the plural reading operations executed by the reading unit respectively, and to discard remaining image data among the plural line image data and different from the one image data, thereby making it possible to generate read-image data composed of line image data aggregation of plural line image data generated by reading the original substantially at an equal interval.

However, in such a case that the generation period of the command signal is shorter only to a little extent than the output time interval of the displacement signal, it is difficult to generate a high-quality read-image data for the following reason. Namely, in a case of thinning (curtailing) a part or portion of plural line image data generated by the respective reading operations by the reading unit so as to generate the read-image data of the original, the reading positions of two line image data located before and after the curtailed line image data are greatly apart.

In view of the above situation, the present teaching adjusts the original-reading position, at which the reading of the original is performed by the reading unit and which is gradually deviated (shifted) from the original-reading position corresponding to the normal (appropriate) reading interval, due to the difference between the generation period of the command signal and the reading interval (output time interval of the displacement signal), by delaying the generation timing of the command signal with the above-described technique.

According to the present teaching, the generation operation of the command signal is delayed, with the time length between the time point (output time point) at which the displacement signal is outputted and a time point (generation time point) which is after the output time point and at which the command signal is generated next time, as an indicator, thereby adjusting the original-reading position by the reading unit. Accordingly, the generation timing of the command signal can be adjusted more easily and more efficiently than the conventional technique.

Namely, according to the present teaching, the generation timing of the command signal can be adjusted such that the original-reading position of the reading unit is an appropriate position, without successively storing the position of the conveyance target and/or updating the control target value for the purpose of evaluating the error between the position of the conveyance target and the control target value as in the conventional technique. Therefore, according to the present teaching, the generation timing of the command signal can be adjusted more efficiently than the conventional technique, thereby making it possible to generate a read-image data with high image quality.

DESCRIPTION OF THE PREFERRED EMBODIMENTS

Figure 1:
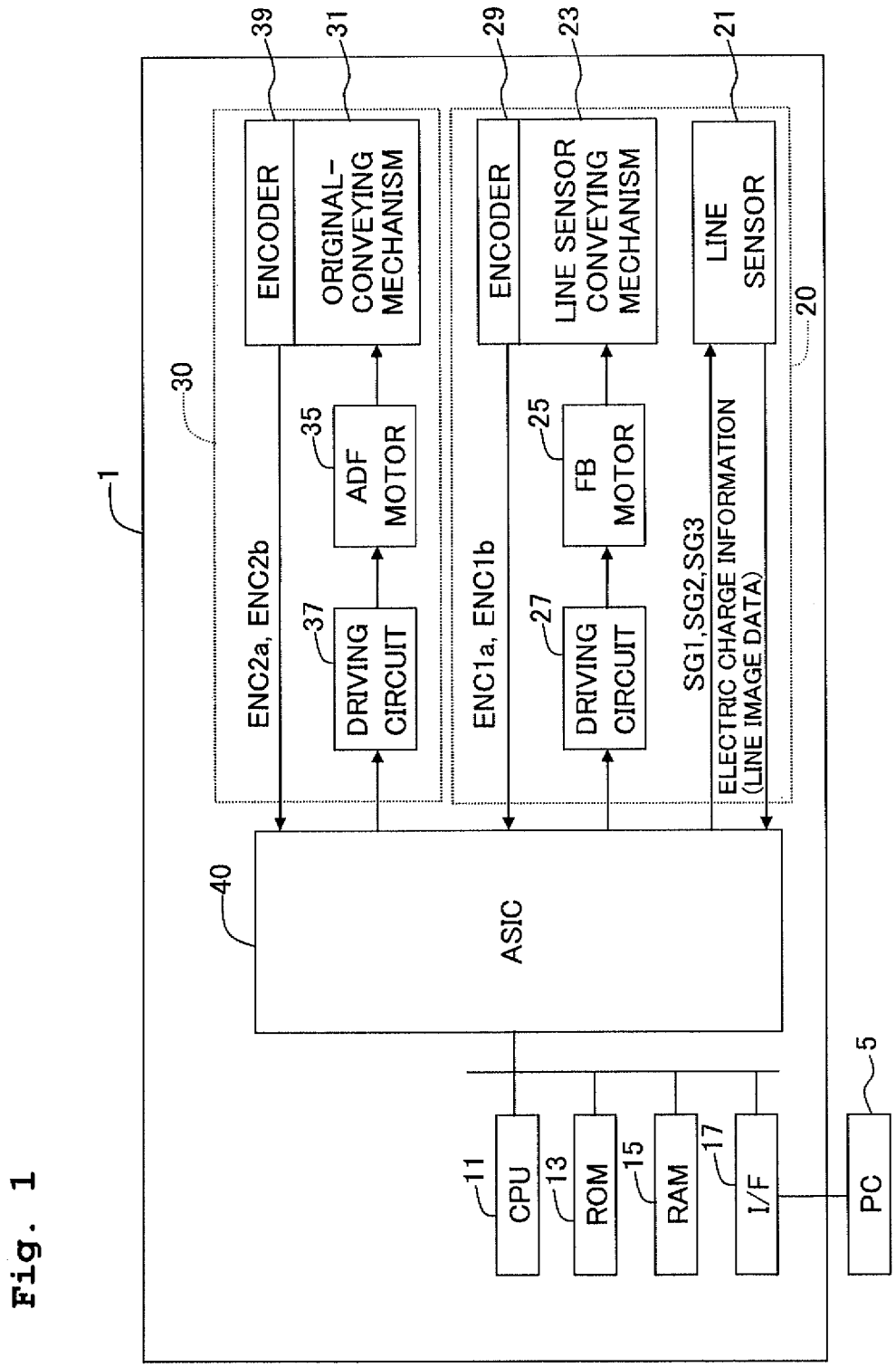
FIG. 1 is a block diagram depicting a schematic configuration of an image reading apparatus.

An embodiment of the present teaching will be explained as follows, with reference to the drawings. An image reading apparatus 1 of the embodiment and depicted in FIG. 1 includes a CPU 11, a ROM 13, a RAM 15, an interface 17, a FB (flatbed) reading device 20, an ADF (auto document feeder) device 30, and an ASIC 40.

The CPU 11 controls the image reading apparatus 1 as a whole by executing a processing according to a program stored in the ROM 13. The RAM 15 is used as a workspace when the CPU 11 executes the program. The interface 17 is configured to be capable of communicating with an external personal computer 5.

The CPU 11 supplies a read-image data of an original Q generated by using the FB reading device 20 to the external personal computer 5 via the interface 17. The FB reading device 20 is configured to read the original Q as an object to be read, by transporting (conveying) the line sensor 21. The ADF device 30 is configured to convey the original Q to a reading position at which the original Q is to be read by the line sensor 21. The ASIC 40 controls the FB reading device 20 and the ADF reading device 30 in accordance with an instruction from the CPU 11.

In the image reading apparatus 1, the CPU 11 sets an operation parameter for the ASIC 40 and activates the ASIC 40. The operation parameter can be exemplified by an operation parameter indicating a reading mode, a reading area, etc. The reading mode can be exemplified by an ADF reading mode, in which the line sensor 21 is arranged in a fixed manner and the original Q is read by the line sensor 21 while conveying the original Q so as to change the relative position between the line sensor 21 and the original Q; and a FB reading mode, in which the line sensor 21 is conveyed to read the original Q placed on a platen glass member 103A.

The ASIC 40 controls the FB reading device 20 and the ADF device 30 in accordance with the operation parameter, and causes the line sensor 21 to execute the reading operation for each line, while changing the relative position between the original Q and the line sensor 21. The line sensor 21 generates, for each of the reading operations, a line image data indicating a result of reading for one line of the original Q. The ASIC 40 executes the shading correction, etc. for each of the line image data generated in such a manner. Each of the corrected line image data generated by the ASIC 40 is stored in the RAM 15.

The CPU 11 transmits each of the line image data stored in the RAM 15 to the personal computer 5 via the interface 17. By doing so, the CPU 11 provide read-image data of the original Q composed of plural line image data. As another example, in a case that the image reading apparatus 1 is a digital multi-function peripheral having a copying function, the read-image data stored in the RAM 15 is subjected to a print processing. With this, a copied image of the original Q is formed on a paper sheet.

Next, the detailed configuration of the FB reading device 20 will be explained. The FB reading device 20 includes the line sensor 21, a line sensor conveying mechanism 23, a FB motor 25, a driving circuit 27 and a FB encoder 29.

The line sensor 21 is configured, for example, as a contact image sensor (CIS). The line sensor 21 is configured to be elongated in a main scanning direction, and to read the original Q in the main scanning direction. The line sensor conveying mechanism 23 receives the driving force from the FB motor constructed of a direct current motor and conveys the line sensor 21 in a sub scanning direction orthogonal to the main scanning direction.

Figure 2:
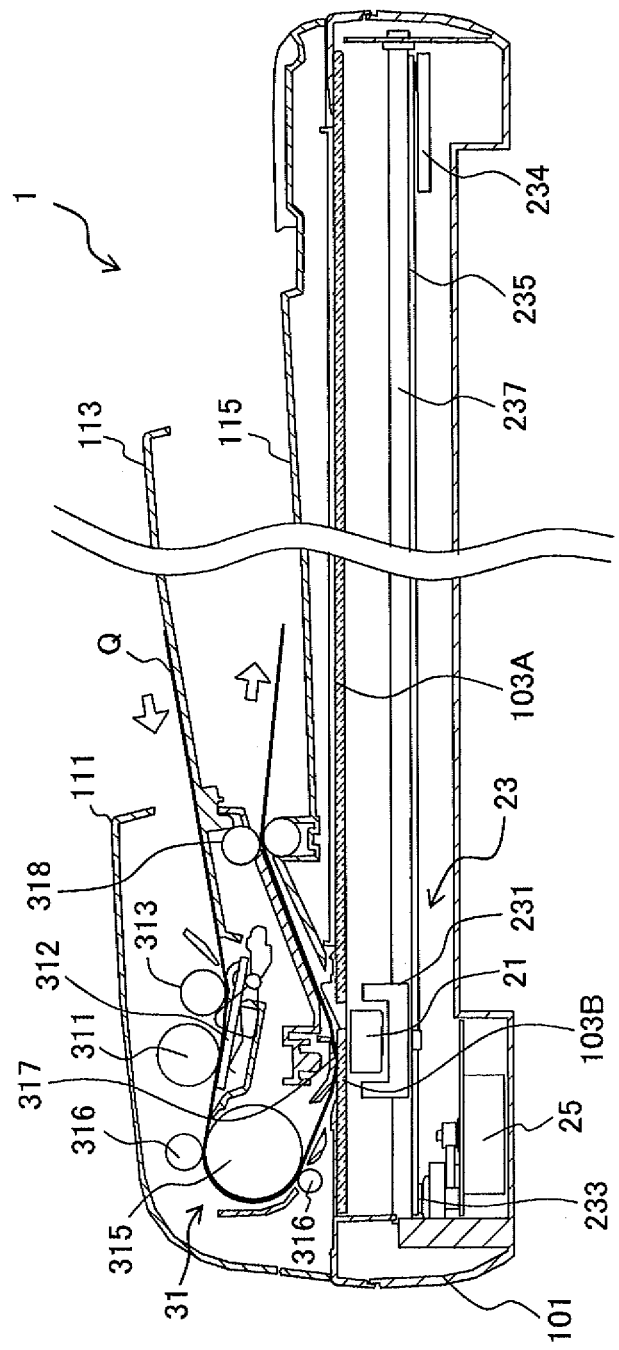
FIG. 2 is a cross-sectional view of the image reading apparatus, depicting a line sensor and a conveying mechanism which conveys an original.

As depicted in FIG. 2, the line sensor conveying mechanism 23 is provided inside a lower case 101 of the image recording apparatus 1. The lower case 101 provided on the image reading apparatus 1 includes transparent platen glass members 103A and 103B which are arranged on the upper surface of the lower case 101. The original Q is placed on the upper surface of the platen glass member 103A manually by a user in the FB reading mode. On the other hand, the platen glass member 103B is used in the ADF reading mode. In the ADF reading mode, the line sensor 21 is arranged in fixed manner in an area located below the platen glass member 103B.

The line sensor conveying mechanism 23 is configured to be capable of conveying the line sensor 21 in the sub scanning direction at an area located below the platen glass members 103A and 103B. In the line sensor conveying mechanism 23, a carriage 231 in which the line sensor 21 is placed is attached to a belt 235 wound around and stretched between a driving pulley 233 and a driven pulley 234. The FB motor 25 is connected to the driving pulley 233 via a gear.

Namely, in the line sensor conveying mechanism 23, the driving pulley 233 is rotated by receiving the driving force from the FB motor 25, and the belt 235 and the driven pulley 234 are rotated in accordance with the rotation of the driving pulley 233, thereby transmitting the driving force to the carriage 231 attached to the belt 235. The carriage 231 receiving the driving force moves in the sub scanning direction while the movement of the carriage 231 is regulated by a guide axis 237. By such an operation, the line sensor conveying mechanism 23 conveys the line sensor 21 in the sub scanning direction.

The driving circuit 27 drives the FB motor 25 in accordance with a control signal from the ASIC 40. The FB encoder 29 is attached to a driving force-transmitting path from the FB motor 25 to the line sensor 21, and outputs pulse signals (ENC1a, ENC1b) in accordance with the movement (conveyance) of the line sensor 21 in the sub scanning direction. Each of the pulse signals (ENC1a, ENC1b) is outputted every time the line sensor 21 is conveyed in the sub scanning direction by a predetermined distance.

For example, the FB encoder 29 is constructed of a rotary encoder provided on the rotation axis of the FB motor 25. The pulse signals (ENC1a, ENC1b) correspond to an A-phase signal (ENC1a) and a B-phase signal (ENC1b), which are different in the phase by $\pi/2$, respectively. In the following, the pulse signals (ENC1a, ENC1b) are also referred to as encoder signals (ENC1a, ENC1b).

On the other hand, the ADF device 30 is provided with an original-conveying mechanism 31, an ADF motor 35, a driving circuit 37 and an ADF encoder 39. The original-conveyance mechanism 31 is provided on an upper case 111 of the image reading apparatus 1, as depicted in FIG. 2. The upper case 111 is provided to be pivotable relative to the lower case 101 of the image recording apparatus 1. The upper case 111 functions as a cover body covering the upper surface of the lower case 101 including the platen glass members 103A and 103B.

The original-conveying mechanism 31 is disposed in the upper case 111 and includes a separation roller 311, a separation pad 312, an intake roller 313, a main roller 315, a pinch roller 316, an original-pressing member 317 and a paper sheet-discharge roller 318.

The separation pad 312 is arranged to face the separation roller 311 and imparts a predetermined conveying resistance to the original Q. The intake roller 313 feeds the original Q (plurality of pieces of the original Q stacked) on an original tray 113 provided on the upper case 111 toward the separation roller 311. The separation roller 311 conveys the original Q toward the main roller 315.

The main roller 315 conveys the original Q conveyed from the separation roller 311 to the downstream in the conveyance path while invering the conveyance direction of the original Q toward the platen glass member 103B. In this situation, the pinch roller 316 presses the original Q toward the main roller 315. The original-pressing member 317 presses the original Q, conveyed from the side of the main roller 315, against the platen glass member 103B. The paper sheet-discharge roller 318 conveys the original Q which is being conveyed while passing a space underneath the original-pressing member 317, toward a paper sheet-discharge tray 115.

The ADF motor 35 is constructed of a direct current motor and imparts the driving force to the original-conveying mechanism 31. The driving circuit 37 drives the ADF motor 35 in accordance with a control signal from the ASIC 40. The rollers 311, 313, 315 and 318 constructing the original-conveying mechanism 31 receive the driving force from the ADF motor 35 and rotate in mutually cooperative manner.

By causing the rollers 311, 313, 315 and 318 to rotate, the original-conveying mechanism 31 conveys the original Q in the sub scanning direction only by an amount in accordance with the rotation amounts of the rollers 311, 313, 315 and 318 from the original tray 113 to the paper sheet-discharge tray 115 via the original-pressing member 317. In the ADF reading mode, the line sensor 21 is arranged at a location below the original-pressing member 317 and reads the original Q when the original Q passes this location.

The ADF encoder 39 outputs pulse signals (ENC2a, ENC2b) in accordance with the conveyance amount of the original Q by the original-conveying mechanism 31. The ADF encoder 39 is constructed, for example, of a rotary encoder. The ADF encoder 39 is provided, for example, on the rotation axis of the ADF motor 35 and outputs the pulse signals (ENC2a, ENC2b) in accordance with the rotation of the ADF motor 35. Each of the pulse signals (ENC2a, ENC2b) is outputted every time the ADF motor 35 is rotated by a predetermined amount, in other words, every time the original Q is conveyed by a predetermined amount. The pulse signals (ENC2a, ENC2b) correspond to an A-phase signal (ENC2a) and a B-phase signal (ENC2b) which are different in the phase by $\pi/2$, respectively. In the following, the pulse signals (ENC2a, ENC2b) are also referred to as encoder signals (ENC2a, ENC2b).

Figure 3:
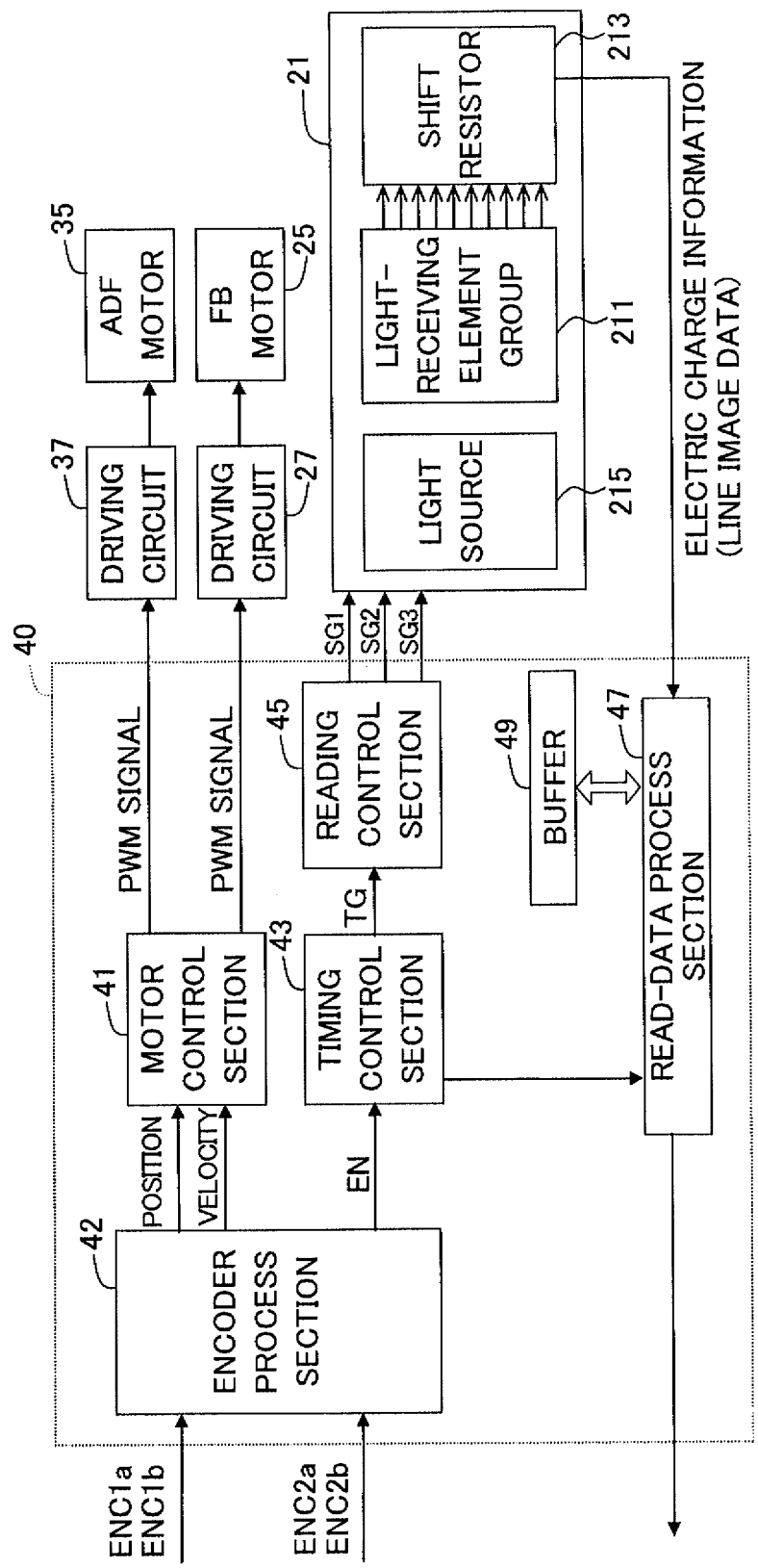
FIG. 3 is a block diagram depicting an inner configuration of an ASIC (Application Specific Integrated Circuit).

Next, the detailed configuration of the ASIC 40 will be explained. The ASIC 40 includes a motor control section 41, an encoder process section 42, a timing control section 43, a reading control section 45, a read-data process section 47 and a buffer 49, as depicted in FIG. 3.

The encoder process section 42 detects the position and velocity of the line sensor 21 based on the encoder signals (ENC1a, ENC1b) inputted from the FB encoder 29 and inputs these detected values to the motor control section 41. Further, the encoder process section 42 detects the rotational position and velocity of the ADF motor 35, which corresponds to the position and velocity of the original Q, based on the encoder signals (ENC2a, ENC2b) inputted from the ADF encoder 39, and inputs these detected values to the motor control section 41.

Furthermore, the encoder process section 42 inputs a displacement signal (EN) corresponding to the reading mode to the timing control section 43. In the FB reading mode, every time the position of the line sensor 21 is changed in the sub scanning direction by a predetermined amount, the encoder process section 42 inputs a pulse signal as the above-described displacement signal (EN) to the timing control section 43 based on the encoder signals (ENC1a, ENC1b) inputted from the FB encoder 29. For example, the encoder process section 42 is capable of inputting any one of the A-phase signal (ENC1a) and the B-phase signal (ENC1b), inputted from the FB encoder 29, to the timing control section 43 as the displacement signal (EN) in the FB reading mode.

On the other hand, in the ADF reading mode, every time the original Q is conveyed by a predetermined amount, the encoder process section 42 inputs a pulse signal as the above-described displacement signal (EN) to the timing control section 43 based on the encoder signals (ENC2a, ENC2b) inputted from the ADF encoder 39. For example, the encoder process section 42 is capable of inputting any one of the A-phase signal (ENC2a) and the B-phase signal (ENC2b), inputted from the ADF encoder 39, to the timing control section 43 as the displacement signal (EN) in the ADF reading mode.

The motor control section 41 controls driving of the FB motor 25 and the ADF motor 35 in accordance with an instruction from the CPU 11. Specifically, in the FB reading mode, the motor control section 41 inputs a PWM signal corresponding to a driving current to be applied to the FB motor 25, to the driving circuit 27, to thereby control the driving of the FB motor 25. The motor control section 41 controls the conveyance velocity of the line sensor 21 in the sub scanning direction by performing a feedback control based on the detected values of the position and velocity of the line sensor 21 inputted from the encoder process section 42.

Further, in the ADF reading mode, the motor control section 41 inputs a PWM signal corresponding to a driving current to be applied to the ADF motor 35, to the driving circuit 37, to thereby control the driving of the ADF motor 35. The motor control section 41 controls the conveyance velocity of the original Q by performing a feedback control based on the detected values of the rotational position and velocity of the ADF motor 35 inputted from the encoder process section 42.

On the other hand, the timing control section 43 controls the reading timing, at which the original Q is read by the line sensor 21, in the FB reading mode and the ADF reading mode. Basically, the timing control section 43 generates a TG signal that is a pulse signal for designating the reading timing of the line sensor 21 periodically at a predetermined time interval and inputs the TG signal to the reading control section 45. Here, the period of the TG signal is represented as "T0". Note that, however, the timing control section 43 adjusts, as necessary, the generation timing of the TG signal to be inputted to the reading control section 45, based on the displacement signal (EN) inputted from the encoder process section 42, thereby adjusting the input timing at which the TG signal is inputted to the reading control section 45.

The reading control section 45 generates a control signal for the line sensor 21 based on the TG signal inputted from the timing control section 43, and inputs the control signal to the line sensor 21. The control signal includes a line start signal (SG1), a lighting control signal (SG2) and a transfer control signal (SG3).

Every time the reading control section 45 detects the rising edge of the TG signal, the reading control section 45 inputs the line start signal (SG1) to the line sensor 21. When the line start signal (SG1) is inputted, the electric charge accumulated in a light-receiving element group 211 provided on the line sensor 21 is transmitted to an analog shift resistor 213. With this, the electric charge, that is generated by the photoelectric effect during a time period from a time point at which the line start signal (SG1) has been inputted to the line sensor 21 last time until a time point at which the line start signal (SG1) is inputted to the line sensor 21 this time, is transmitted to the analog shift resistor 213.

As depicted in FIG. 3, the line sensor 21 includes light-receiving elements each provided for every pixel (light-receiving element group 211), the analog shift resistor 213 having a size corresponding to the number of the light-receiving elements, and a light source 215. The information of electric charge per each of the light-receiving elements, that is transmitted to the analog shift resistor 213 by the input of the line start signal (SG1), corresponds to a pixel data. Namely, the information aggregation of electric charge stored in the analog shift resistor 213 corresponds to the pixel data aggregation representing a result of reading of one line of the original Q, and corresponds to the line image data.

Due to the transmittance of the accumulated electric charge of the light-receiving element group 211 to the analog shift resistor 213, the accumulated electric charge in each of the light-receiving elements is initialized, and in the light-receiving element group 211, a new reading operation utilizing the photoelectric effect is started.

The lighting control signal (SG2) is a signal for controlling the lighting ON and lighting OFF of the light source 215. The reading control section 45 inputs the lighting control signal (SG2) for lighting ON the light source 215 synchronizing with the input of the line start signal (SG1), to the line sensor 21. Specifically, the reading control section 45 inputs the lighting controlling signal (SG2) to the line sensor 21 so that the light source 215 is switched ON for a predetermined time period from a time point at which the line start signal (SG1) has been inputted. The light source 215 is lighted ON in accordance with the lighting control signal (SG2) and irradiates a light onto the original Q.

The transfer control signal (SG3) is a signal for controlling an operation of transferring the electric charge information, which is stored in the analog shift resistor 213, from the line sensor 21 to the read-data process section 47. When a certain TG signal is inputted to the reading control section 45, the reading control section 45 inputs the transfer control signal (SG3) to the line sensor 21 so that the electric charge information (line image data), that is transferred to the analog shift resistor 213 at a time point at which the line start signal (SG1) corresponding to the certain TG signal has been inputted, is transferred to the read-data process section 47 before next time point at which next line start signal (SG1) will be inputted to the line sensor 21.

The read-data process section 47 converts the electric charge information inputted from the line sensor 21 to digital line image data. Further, the read-data process section 47 performs image processing such as the shading correction, gamma correction, etc. to the line image data, and causes the RAM 15 to store the corrected line image data corrected by such image processing. Among the line image data inputted from the line sensor 21 to the read-data process section 47, the line image data before being corrected and the line image data after being corrected and before being stored to the RAM 15 are temporarily stored in the buffer 49.

In some cases, the available storage capacity of the buffer 49 is reduced by any delay in the processing after the line image data has been corrected in the read-data process section 47 until the corrected line image data is stored in the RAM 15. In a case that the available storage capacity of the buffer 49 is less than a threshold value, the read-data process section 47 inputs a memory full signal to the motor control section 41 so as to temporarily interrupt (pause) the conveying operation of the original Q or the line sensor 21 executed by the motor control section 41.

Figure 4A:
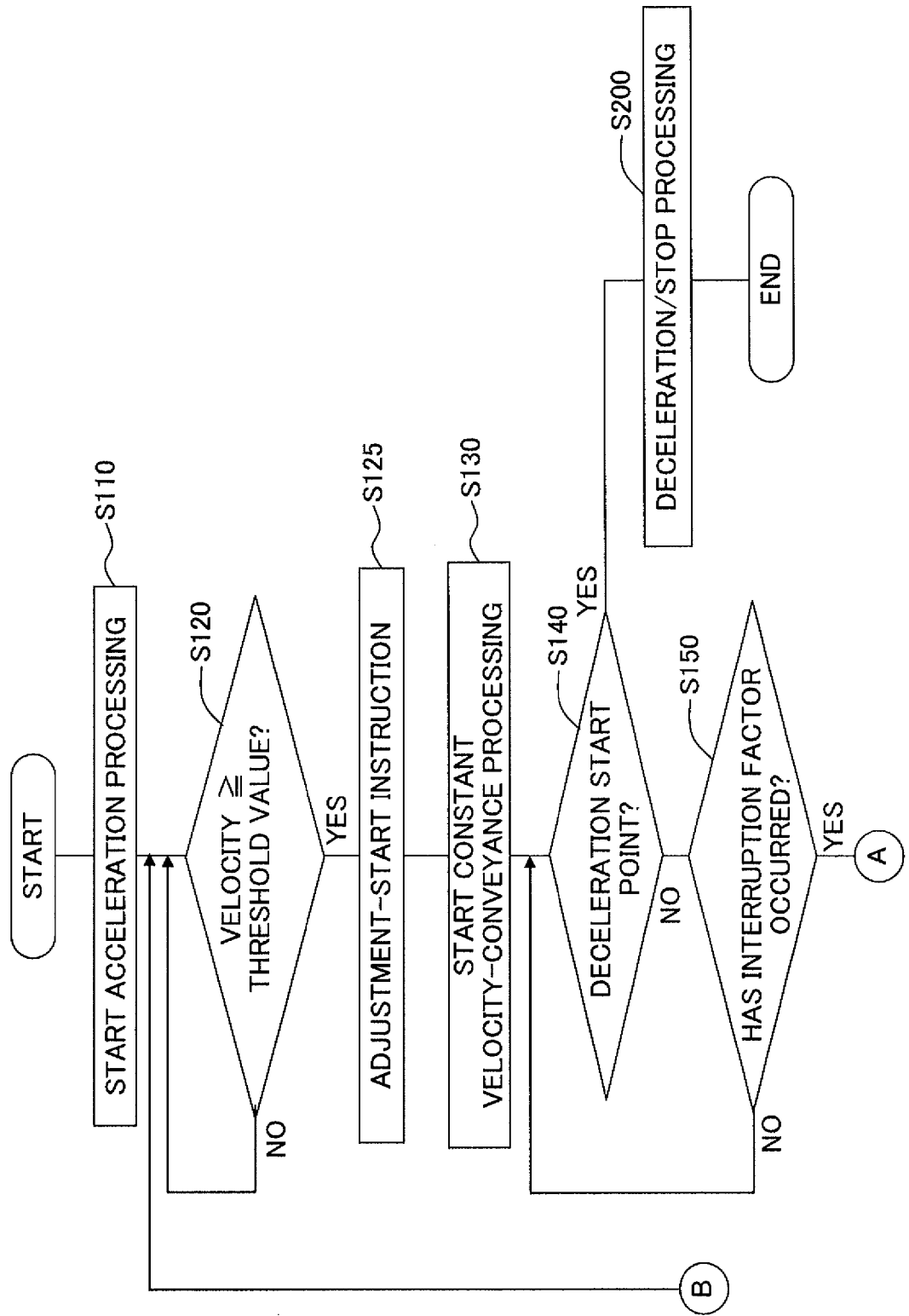
FIGS. 4A and 4B indicate a flow chart indicating a processing executed by a motor control section.
Figure 4B:
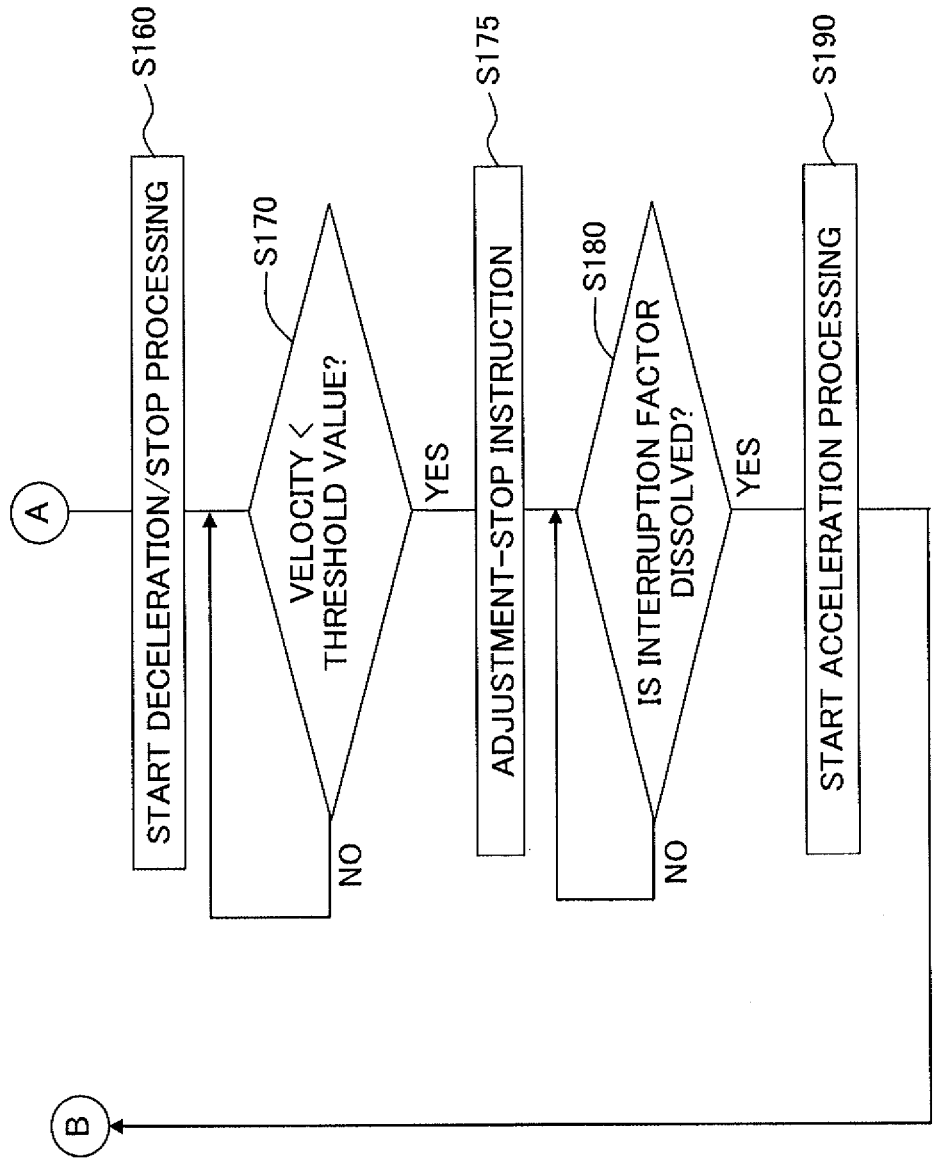

The processing operation by the motor control section 41 is executed in accordance with a flow chart indicated in FIGS. 4A and 4B. In the FB reading mode, the motor control section 41 sets the line sensor 21 as a conveyance target, and executes the processing indicated in FIGS. 4A and 4B. In the ADF reading mode, the motor control section 41 sets the original Q as the conveyance target, and executes the processing indicated in FIGS. 4A and 4B. This processing is started by an instruction from the CPU 11 triggered, for example, by a pressing operation by a user made on a non-illustrated operation section.

In a case that the processing is started, the motor control section 41 starts a motor control for accelerating the conveyance target (S110). This motor control is executed until velocity V of the conveyance target reaches a predetermined constant target velocity Vc. In the FB reading mode, the motor control section 41 determines the driving current to be applied to the FB motor 25 as a motor to be driven, based on the velocity V of the line sensor 21 detected by the encoder process section 42, and inputs a PWM signal corresponding to the determined driving current to the driving circuit 27.

On the other hand, in the ADF reading mode, the motor control section 41 determines the driving current to be applied to the ADF motor 35 as a motor to be driven, based on the rotational velocity of the ADF motor 35 detected by the encoder process section 42 and corresponding to the velocity V of the original Q, and inputs a PWM signal corresponding to the determined driving current to the driving circuit 37. With this, the velocity of the conveyance target is accelerated up to the target velocity Vc in the acceleration segment after the start of conveyance. The term "acceleration segment" described in the embodiment means a conveyance segment until the velocity V of the conveyance target reaches the target velocity Vc.

The motor control section 41 judges whether or not the velocity V of the conveyance target is a value which is not less than a predetermined threshold value during the acceleration of the conveyance target by the motor control (S120). At a time point at which the velocity V of the conveyance target reaches a value not less than the threshold value (S120: YES), the motor control section 41 inputs an instruction (adjustment-start instruction) to the timing control section 43 so as to start adjustment of the TG signal (S125). The details about the adjustment of the TG signal will be described later on. In a case that the adjustment-start instruction is inputted to the timing control section 43, the timing control section 43 starts a processing for adjusting, as necessary, the input timing at which the TG signal is inputted to the reading control section 45, based on the displacement signal (EN).

In a case that the velocity V of the conveyance target has reached the target velocity Vc, the motor control section 41 starts a constant velocity-conveyance processing (S130). In the constant velocity-conveyance processing, the motor control section 41 determines the driving current to be applied to the motor (FB motor 25 or ADF motor 35) so that the conveyance target is conveyed at a constant velocity that is the target velocity Vc, and the motor control section 41 inputs a PWM signal corresponding to the determined driving current to the driving circuit 27 or 37 corresponding to the conveyance target. With this, in the constant velocity segment following the acceleration segment, the conveyance target is conveyed at the target velocity Vc. The term "constant velocity segment" described in the embodiment means a segment in which the velocity V of the conveyance target is maintained at a constant velocity (target velocity Vc).

After that, the motor control section 41 judges whether or not the conveyance target has reached a deceleration start point (S140). The deceleration start point is set as follows. Namely, at first, a reading completion point is determined as a position of the conveyance target at a time point when the reading operation for the last line of the original Q is completed. Then, the deceleration start point is set as a same point with the reading completion point, or a point around the reading completion point.

In a case that the motor control section 41 judges that the conveyance target has reached the deceleration start point (S140: YES), the process proceeds to S200 and performs a motor control for decelerating and stopping the conveyance target. With this motor control, the conveyance target is decelerated and stopped in the deceleration segment following the constant velocity segment. The term "decelerating segment" described in the embodiment means a conveyance segment in which the velocity V of the conveyance target is decelerated from the target velocity Vc until the conveyance target is stopped.

In a case that the deceleration start point is set at a point upstream of the reading completion point, the line sensor 21 executes the reading operation for each of the lines, even in the deceleration segment, in accordance with the control signal from the reading control section 45 until the conveyance target has passed through the reading completion point.

In S200, the motor control section 41 inputs an instruction for stopping the adjustment (adjustment-stop instruction) of the TG signal to the timing control section 43 at a time point at which the conveyance velocity V becomes a value less than the threshold value. When this adjustment-stop instruction is inputted to the timing control section 43, the timing control section 43 stops the processing for adjusting the input timing of the TG signal to the reading control section 45.

Figure 5:
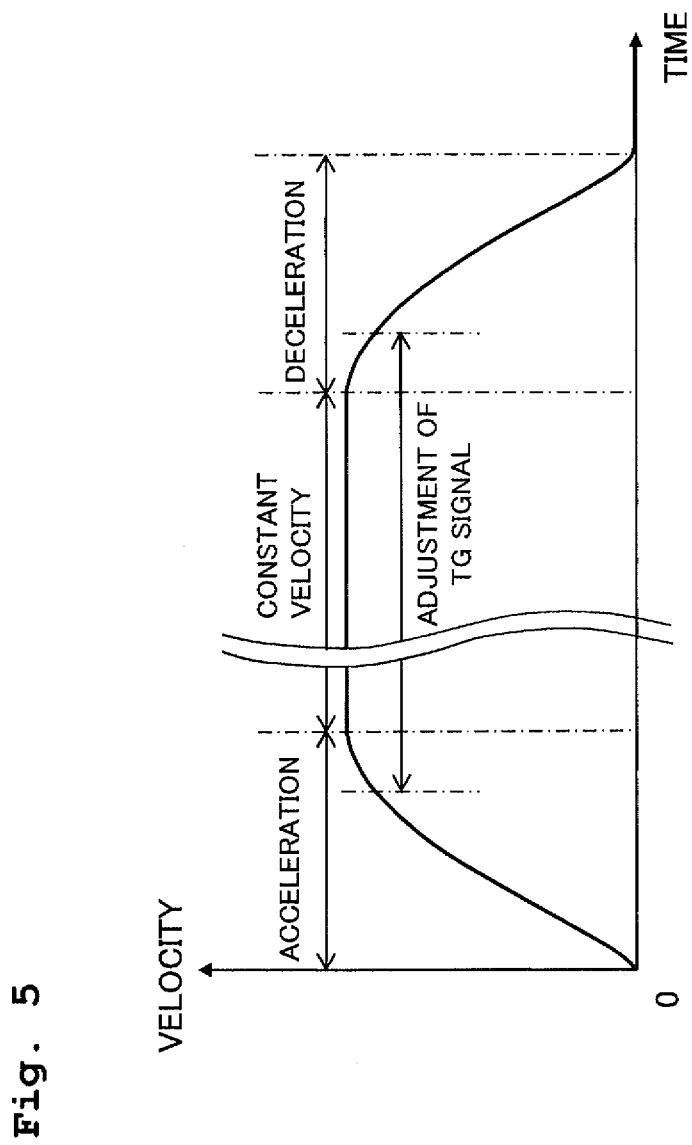
FIG. 5 is a graph indicating a velocity locus of a conveyance target.

According to such a processing executed by the motor control section 41, the adjustment of the input timing of the TG signal is executed, as depicted in FIG. 5, in the constant velocity segment and in each of the acceleration and deceleration segments only in an area (region) thereof in which the velocity V has a value not less than the threshold value. A time-velocity graph indicated in FIG. 5 indicates, as an example, the locus of velocity V of the conveyance target from the acceleration to the deceleration.

In the ADF reading mode, when the reading operation up to the last line is completed, a judgment is made in S140 that the original Q as the conveyance target has reached the deceleration start point. In S200, the original Q as the conveyance target is conveyed, without decreasing the velocity V of the original Q, until the original Q is discharged to the paper sheet-discharge tray 115. Afterward, the motor control section 41 ends the processing indicated in FIGS. 4A and 4B.

On the other hand, in a case that the motor control section 41 judges that the conveyance target has not reached the deceleration start point (S140: NO), the motor control section 41 judges whether or not any interruption factor for the motor control has occurred. The motor control section 41 judges that the interruption factor has occurred, under a condition that the memory full signal is inputted to the motor control section 41 from the read-data process section 47 (S150).

In a case that the motor control section 41 judges that any interruption factor has not occurred (S150: NO), the process proceeds to S140. In a case that the motor control section 140 judges that the interruption factor has occurred (S150: YES), the process proceeds to S160. After proceeding to S160, the motor control section 41 starts the motor control for decelerating and stopping the conveyance target. The TG signal is inputted to the reading control section 45 also during the deceleration and stopping of the conveyance target by this motor control, and the reading operation by the line sensor 21 is executed continuously and repeatedly.

During the deceleration, the motor control section 41 judges whether or not the conveyance velocity V has become a value less than the threshold value (S170). Further at a time point at which the conveyance velocity V has become the value less than the threshold value (S170: YES), the motor control section 41 inputs the adjustment-stop instruction to the timing control section 43 (S175).

Then, the motor control section 41 stands by in a state that the conveyance target is stopped, until the interruption factor is dissolved (S180). For example, the motor control section 41 stands by until the interruption factor is dissolved by such a situation that the available storage capacity of the buffer 49 has become a value not less than the threshold value.

In a case that the motor control section 41 judges that the interruption factor has been dissolved (S180: YES), the motor control section 41 controls the motor, and starts the motor control for accelerating the conveyance target up to the target velocity Vc (S190).

Then, the process proceeds to S120, and at a time point at which the velocity V of the conveyance target has become a value not less than the threshold value (S120: YES), the motor control section 41 inputs the adjustment-start instruction for adjusting the TG signal again to the timing control section 43 (S125). Further, when the velocity V of the conveyance target has reached the target velocity Vc, the motor control section 41 starts the control for performing constant velocity-conveyance (S130).

Figure 6:
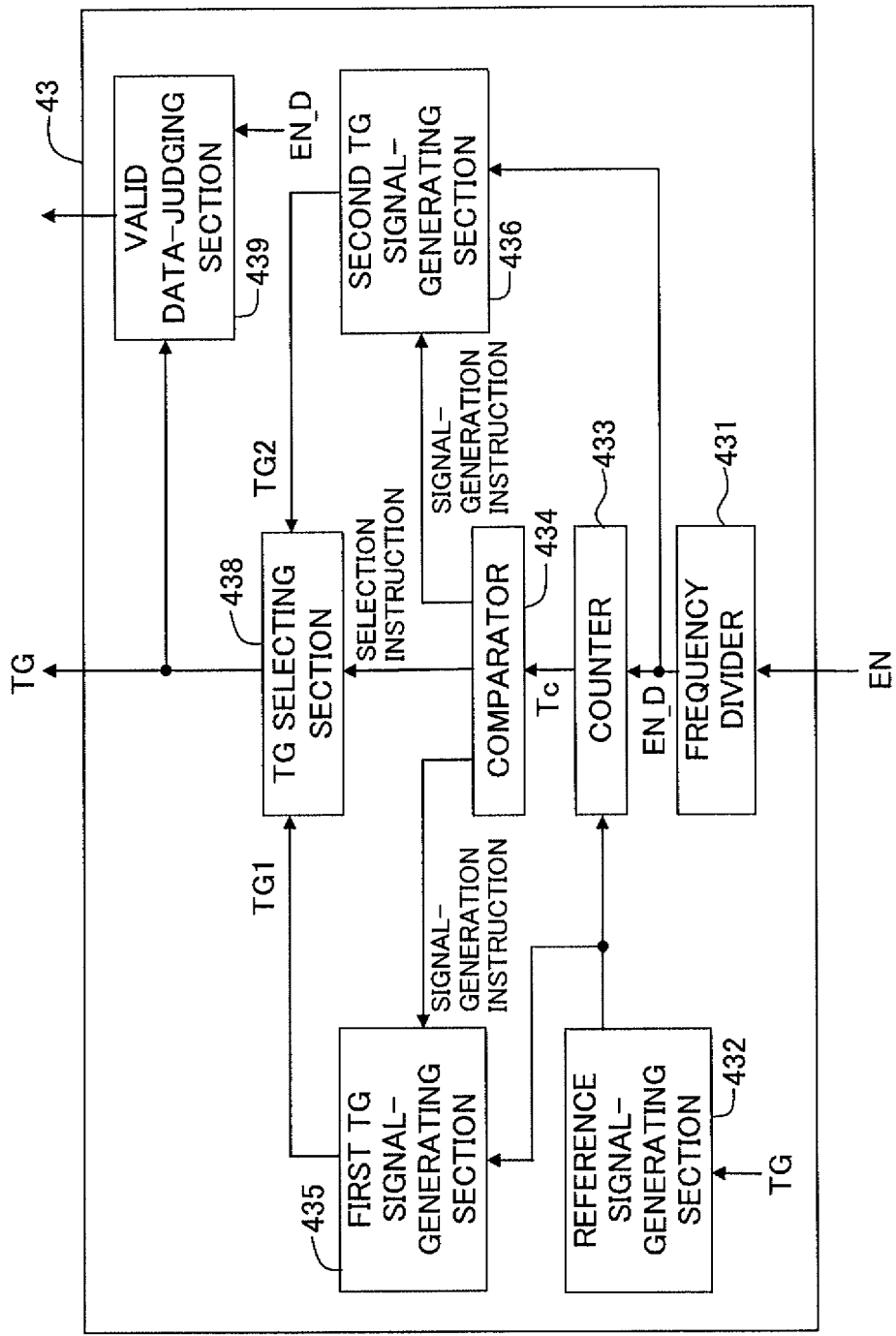
FIG. 6 is a block diagram depicting a configuration of a timing control section.

Next, the detailed configuration of the timing control section 43 will be explained with reference to FIGS. 6 to 8. As depicted in FIG. 6, the timing control section 43 includes a frequency divider 431, a reference signal-generating section 432, a counter 433, a comparator 434, a first TG signal-generating section 435, a second TG signal-generating section 436, a TG selecting section 438 and a valid data judging-section 439.

The frequency divider 431 divides the displacement signal (EN) inputted from the encoder process section 42 and inputs a divided displacement signal (EN_D) to the counter 433, the second TG signal-generating section 436 and the valid data judgingsection 439. The division ratio is determined so that the displacement amount of the conveyance target corresponding to the appearance time interval of the rising edge of the divided displacement signal (EN_D, hereinafter referred also to as "displacement signal (EN_D) as appropriate) is a distance corresponding to the width of one line of the original Q in the sub scanning direction.

The period T0 of the TG signal inputted to the reading control section 45 is set to be shorter only to a little extent than an appearance (occurrence) time interval TE of the rising edge of the displacement signal (EN_D) when the conveyance target is conveyed at the target velocity VC in the constant velocity segment. For example, assuming there is such a possibility that the velocity V of the conveyance target might become greater than the target velocity Vc due to any control error when the conveyance target is conveyed at the constant velocity, the period T0 may be set to be shorter than the appearance time interval TE in view of such a possibility. The ratio of the period T0 to the appearance time interval TE is, for example, T0:TE=7:8.

On the other hand, the reference signal-generating section 432 inputs a periodic pulse signal, which corresponds to the period T0 of the TG signal, to the counter 433 and the first TG signal-generating section 435, as a reference signal defining the input timing of the TG signal to the reading control section 45. Specifically, the reference signal-generating section 432 inputs the pulse signal to the counter 433 and the first TG signal-generating section 435, at a time point at which a time corresponding to the period T0 has elapsed from a generation time point at which the TG signal has been generated last time as the input signal to the reading control section 45.

The counter 433 measures, for each displacement signal (EN_D), an elapsed time Tc elapsed from a certain time point of appearance (occurrence) of the rising edge of the displacement signal (EN_D) inputted from the frequency divider 431 until another time point of appearance of the rising edge of the reference signal inputted after the certain time point, and the counter 433 inputs the elapsed time Tc to the comparator 434 for each displacement signal (EN_D).

In a case that the elapsed time Tc has a value not less than a reference value Tref, the comparator 434 inputs a first TG signal (TG1) generation instruction for generating the first TG signal (TG1) to the first TG signal-generating section 435, and inputs an instruction for selecting the first TG signal (TG1) to the TG selecting section 438. On the other hand, in a case that the elapsed time Tc has a value less than the reference value Tref, the comparator 434 inputs a second TG signal (TG2) generation instruction for generating the second TG signal (TG2) to the second TG signal-generating section 436, and inputs an instruction for selecting the second TG signal (TG2) to the TG selecting section 438.

Note that, however, the comparator 434 executes the above-described processing only during a time period from the adjustment-start instruction has been inputted until the adjustment-stop instruction is inputted. In any other time period(s) different from this time period, the comparator 434 inputs the first TG signal generation instruction to the first TG signal-generating section 435, regardless of whether or not the elapsed time Tc has a value not less than the reference value Tref. With this input, the first TG signal (TG1) among the first and second TG signals (TG1, TG2) is inputted to the reading control section 45, as the TG signal.

Further, the comparator 434 controls the second TG signal-generating section 436 and the TG selecting section 438 so that the second TG signal (TG2) is inputted to the reading control section 45 as the TG signal, immediately after a time point P1 at which the adjustment-start instruction has been inputted.

When the first TG signal-generating section 435 receives the first TG signal generation instruction, the first TG signal-generating section 435 generates the first TG signal (TG1) that is a TG signal in accordance with the reference signal, and inputs the first TG signal (TG1) to the TG selecting section 438. For example, when the first TG signal-generating section 435 receives the first TG signal generation instruction, the first TG signal-generating section 435 may be configured to allow the reference signal as it is to be inputted to the TG selecting section 438, as the first TG signal (TG1). As another example, the first TG signal-generating section 435 may be configured to input a pulse signal, rising at a timing at which the first TG signal generation instruction is inputted, to the TG selecting section 438 as the first TG signal (TG1).

On the other hand, when the second TG signal-generating section 436 receives the second TG signal generation instruction, the second TG signal-generating section 436 generates a pulse signal of which rising is delayed by a predetermined time Td from the rising edge of the displacement signal (EN_D), as the second TG signal (TG2), and inputs the second TG signal (TG2) to the TG selecting section 438.

The TG selecting section 438 inputs one of the first TG signal (TG1) and the second TG signal (TG2), in accordance with a selection instruction inputted from the comparator 434, to the reading control section 45 as the TG signal. The timing control section 43 generates the TG signal to be inputted to the reading control section 45, in such a manner.

Figure 7:
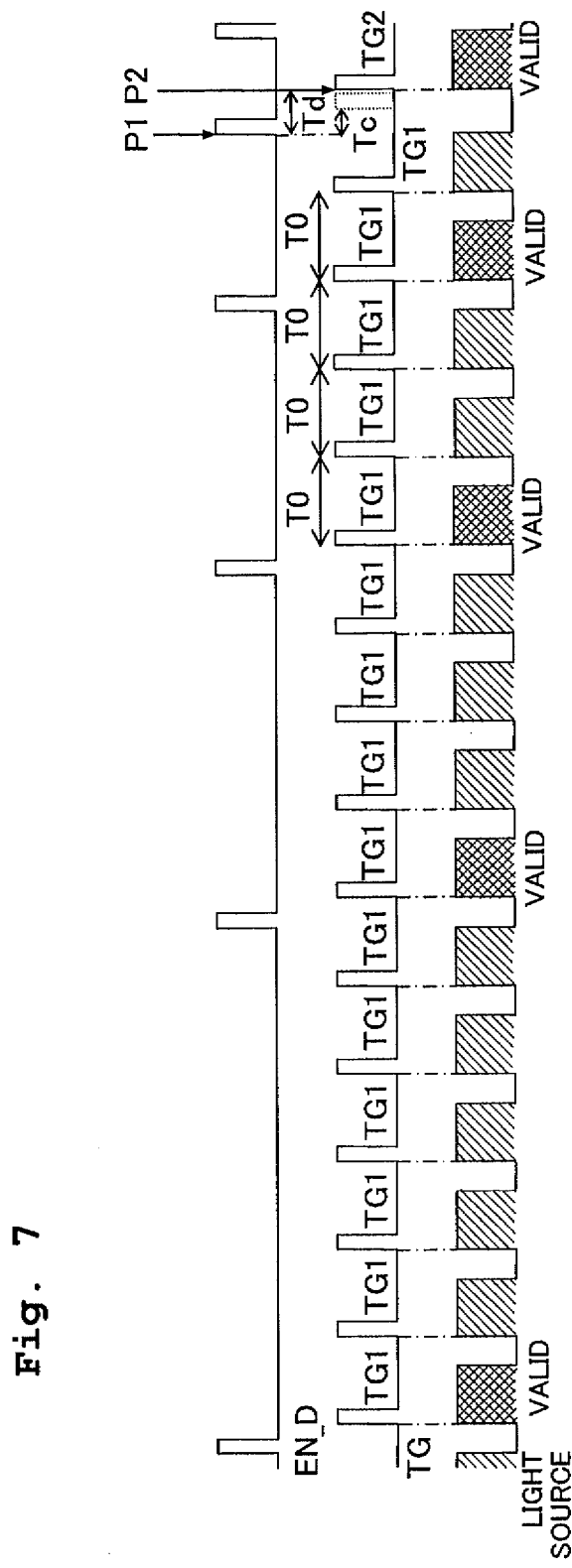
FIG. 7 is a time chart indicating a waveform of a TG signal from an acceleration segment to a constant velocity segment.
Figure 8:
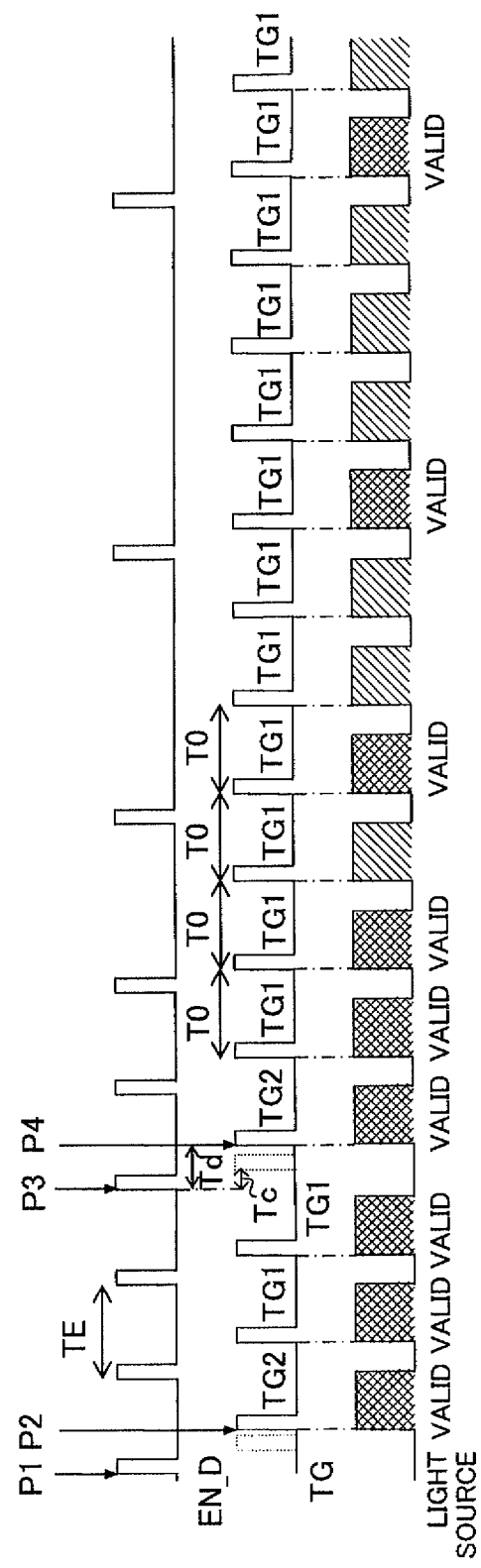
FIG. 8 is a time chart indicating a waveform of the TG signal from the constant velocity segment to a deceleration segment.

According to the timing control section 43 configured in this manner, the TG signal is inputted to the reading control section 45 with patterns as depicted in FIGS. 7 and 8, and the reading operation corresponding thereto is executed by the line sensor 21.

Based on the TG signal inputted to the reading control section 45 and the displacement signal (EN_D) inputted from the frequency divider 431 to the valid data judging section 439, the valid data judgingsection 439 judges, at each appearance (occurrence) of the rising edge of the displacement signal (EN_D), a line image data corresponding to an electric charge information transmitted to the analog shift resistor 213 by a TG signal which is generated secondly after the time point of appearance of the rising edge, as a valid data. Then, the valid data judgingsection 439 inputs a result of this judgment to the read data-process section 47.

The line image data judged as the valid data is a line image data based on the electric charge accumulated in the light-receiving element group 211 during a time period that is after appearance of the rising edge of the displacement signal (EN_D) and ranging from first generation time point of the TG signal until second generation time point of the TG signal.

In accordance with such a result of judgment by the valid data judgingsection 439, the read-data process section 47 selects one line image data at each rising edge of the displacement signal (EN_D) (in other words, at each conveyance, of the conveyance target, corresponding to one line of the original), the one line image being included in plural line image data generated by the reading operations executed by the line sensor 21 a plurality times respectively. The read-data process section 47 transmits the selected one line image data to the RAM 15 and discards remaining line image data among the plural line image data and different from the selected one image data.

FIG. 7 is a time chart indicating the waveform of the divided displacement signal (EN_D) in the first stage, indicating the waveform of the TG signal in the second stage, and indicating ON/OFF of the light source 215 in the third stage. FIG. 8 is a time chart, after the time point P1 indicated in FIG. 7, indicating the waveform of the displacement signal (EN_D), the waveform of the TG signal, and the ON/OFF of the light source 215 in the first stage to the third stage, respectively.

In the third stage of each of FIGS. 7 and 8, a hatched area depicted with diagonal lines indicates that a line image data corresponding to the electric charge accumulated in the light-receiving element group 211 during the lighted-ON period of the light source 215 is judged as a non-valid data. On the other hand, a hatched area depicted with mesh lines indicates that a line image data corresponding to the electric charge accumulated in the light-receiving element group 211 during the lighted-ON period of the light source 215 is judged as a valid data.

The time point P1 indicated in FIG. 7 is a time point at which the adjustment-start instruction of the TG signal is inputted by a situation that the velocity V of the conveyance target has become a value not less than the threshold value. A time point P2 is a time point elapsed by the predetermined time Td from the rising edge of the displacement signal (EN_D) appeared at the time point P1. Immediately after the input of the adjustment-start instruction, at the time point (time point P2) elapsed by the predetermined time Td from the time point of appearance of the rising edge of the displacement signal (EN_D), the second TG signal (TG2) from the second TG signal-generating section 436 is inputted to the reading control section 45.

As appreciated from FIG. 7, the threshold value defining the input timing of the adjustment-start instruction (the threshold value which is referred to in S120) is set to be such a velocity V of the conveyance target that the appearance time interval of the rising edge of the displacement signal (EN_D) is less than twice the period T0 of the TG signal.

The adjustment processing of the input timing of the TG signal is started at the time point P1 at which the velocity V of the conveyance target has a value not less than the threshold value, immediately before the conveyance target proceeds to (enters to) the constant velocity segment from the acceleration segment. During the time period before the time point P1, the TG signal is regularly inputted to the reading control section 45 at the period T0, without any adjustment being made to the input timing of the TG signal, and the reading operation is executed in the line sensor 21 with the period T0.

Even after the adjustment start-instruction has been generated, the TG signal is basically inputted to the reading control section 45 with the period T0. Note that, however, the timing control section 45 identifies the elapsed time Tc elapsed from a time point of appearance of the rising edge of the displacement signal (EN_D) until another time point at which the TG signal is inputted to the reading control unit 45. In a case that the elapsed time Tc has a value less than the reference value Tref (corresponding to the elapsed time Tc indicated in FIG. 8), the timing control section 43 controls the second TG signal-generating section 436 and the TG selecting section 438, so that the second TG signal (SG2) is inputted from the second TG signal-generating section 436 to the reading control section 45 at a time point (corresponding to a time point P4 indicated in FIG. 8) elapsed by the predetermined time Td from a time point P3 at which the rising edge of the displacement signal (EN_D) has appeared.

The configuration of the image reading apparatus 1 of the embodiment has been described as above. According to the method for adjusting the generation and input timing of the TG signal of the embodiment, it is possible to appropriately adjust the original-reading position by the line sensor 21 which is gradually deviated (shifted) from the original-reading position corresponding to the normal (appropriate) reading interval, due to the difference between the period T0 of the TG signal and the normal reading interval (the appearance time interval TE of the rising edge of the displacement signal (EN_D)).

In such a case that the period T0 of the TG signal is shorter only to a little extent than the output time interval TE of the displacement signal (EN_D), it is difficult to generate a high-quality read-image data for the following reason. Namely, in a case of thinning (curtailing) a part or portion of plural line image data generated by the respective reading operations so as to generate the read-image data of the original, the reading positions of two line images located before and after the curtailed line image are greatly apart.

In view of the above situation, the present embodiment adjusts the original-reading position by the line sensor 21, by delaying the input operation of the TG signal from the TG selecting section 438 to the reading control section 45 at an appropriate timing, based on the length (value) of the time length (elapsed time Tc) from the rising edge of the displacement signal (EN_D) until the generation time point at which the TG signal is generated next to the rising edge. Thus, according to the present embodiment, the reading timing by which the original is read by the line sensor 21 can be adjusted appropriately.

Further, according to the present embodiment, the input timing of the TG signal can be adjusted such that the original-reading position is an appropriate position, without successively storing the position of the conveyance target and/or updating the control target value for the purpose of evaluating the error between the position of the conveyance target and the control target value as in the conventional technique. Therefore, according to the present teaching, the reading timing can be adjusted more easily and more efficiently than the conventional technique, thereby making it possible to generate a read-image data with high image quality.

Furthermore, according to the embodiment, the input timing of the TG signal is adjusted only in the high-velocity conveyance segment in which the appearance time interval of the rising edge of the displacement signal (EN_D) is less than twice the period T0 of the TG signal. In other words, the present embodiment is configured such that under a condition that the appearance time interval TE is not less than twice the period T0 of the TG signal and that the line sensor 21 can be made to execute the reading operation a plurality of times during a conveyance time period corresponding to one line of the original, the input timing of the TG signal is not adjusted. Thus, according to the embodiment, the reading timing can be efficiently adjusted, without needing to perform any unnecessary timing adjustment.

Note that the above-described reference value Tref can be determined to be not more than difference between the appearance time interval TE of the displacement signal (EN_D) in the constant velocity segment (namely, the output time interval TE in a case that the conveyance target is conveyed at the target velocity Vc) and the period T0 of the TG signal (TE−T0). Specifically, the reference value Tref can be determined to a value same as the difference.

In the constant velocity segment, the input timing of the TG signal is deviated relative to the appearance timing of the rising edge of the displacement signal (EN_D) by a time corresponding to the above-described difference. Accordingly, by delaying the input timing of a TG signal which is to be inputted within a time period starting from the rising edge of the displacement signal (EN_D) and corresponding to the length of the difference (TE−T0), it is possible to suppress such a phenomenon that the input timing of a TG signal to be inputted next is before (precedes) the appearance time point of the rising edge of a displacement signal (EN_D) to be outputted next.

Further, the time Td can be determined to be greater than the reference value Tref. Specifically, the time Td can be determined to be greater than twice the difference (TE−T0) between the appearance time interval TE of the rising edge of the displacement signal (EN_D) in the constant velocity segment and the period T0 of the TG signal. Also in the constant velocity segment, the velocity V of the conveyance target varies due to any control error. When considering this situation, the time Td can be determined to be greater than twice the difference (TE−T0), by using an appearance time interval TE adopted when the velocity V is lowest in the constant velocity segment.

By setting the time Td in such a manner, the frequency of occurrence of the phenomenon, that the elapsed time Tc is less than the reference value Tref, can be suppressed to be smaller than in a case that the time Td is set to be less than twice the difference (TE−T0). In a case that the input timing of the TG signal is adjusted highly frequently, the period of the TG signal is likely to vary (fluctuate) by the above-described adjustment. However, by suppressing the frequency of occurrence of the above-described phenomenon, the variation in the period can be suppressed, thereby making it possible to increase the quality of read-image.

Other than this, the time Td can be determined, with the appearance time interval TE of the rising edge of the displacement signal (EN_D) in the constant velocity segment as the reference, so that the time Td is not more than ½ times the appearance time interval TE. Considering any fluctuation (variation) in the velocity in the constant velocity segment, the time Td can be determined to be not more than ½ times an appearance time interval TE adopted when the velocity V is highest in the constant velocity segment.

In a case that the time Td is set to be a great value, the adjustment amount of the TG signal becomes great, as a result. On the other hand, in a case that the time Td is set to be a value within the above-described range, the adjustment amount of the input timing of the TG signal can be set within a value not more than half the reading interval. Accordingly, it is possible to suppress any effect to the image quality of the read image caused by the change in the reading position brought about by the adjustment.

Figure 9:
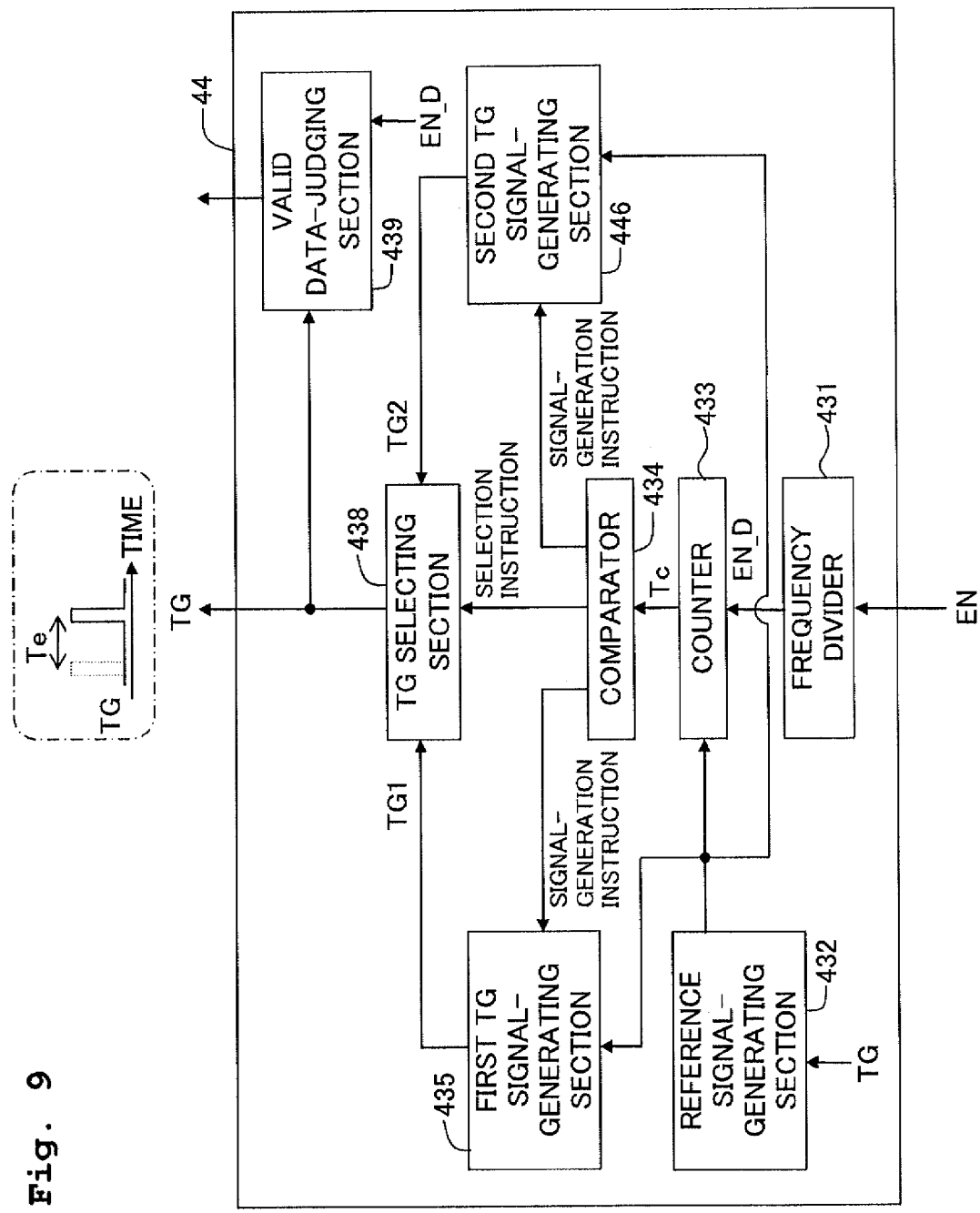
FIG. 9 is a block diagram depicting a configuration of a timing control section of a modification.

Next, a modification of the present teaching will be explained. A timing control section 44 depicted in FIG. 9 is used in the image reading apparatus 1 of the above-described embodiment, instead of the timing control section 43 depicted in FIG. 6. In the timing control section 44 of the modification, the constitutive parts or elements, designated with the same reference numerals as those in the embodiment, are configured in a similar manner as in the embodiment.

The timing control section 44 of the modification is different from the timing control section 43 of the embodiment in that the configuration of a second TG signal-generating section 446 is different from the second TG signal-generating section 436 of the embodiment. Rather than generating (outputting) the displacement signal (EN_D), the second TG signal-generating section 446 generates a second TG signal (TG2), based on a reference signal from a reference signal-generating section 432. The second TG signal (TG2) has a rising edge delayed by a predetermined time Te from the rising edge of a first TG signal (TG1) outputted by the first TG signal generating section 435. The time Te is set to be a value greater than the reference value Tref.

Namely, in a case that the elapsed time Tc is less than the reference value Tref, the timing control section 44 delays the input timing of the TG signal to a time point at which the time T0 is elapsed from the previous input point of time of the TG signal inputted last time. In other words, the timing control section 44 delays the input timing of the TG signal from the input time point of the first TG signal (TG1) by the predetermined time Te, and inputs the second TG signal (TG2) to the reading control section 45 at this delayed timing. With this method, the generation of the TG signal and the delaying of the inputting operation can be performed easily and appropriately, thereby making it possible to appropriately adjust the original-reading position by the line sensor 21.

Additionally, according to the modification, it is possible to prevent the deviation in the input period of the TG signal from exceeding the time Te, as compared with a case of delaying the input timing of the TG signal with the rising edge of the displacement signal (EN_D) as the reference. Accordingly, the period of the TG signal can be made stable, as compared with the above-described embodiment. In the modification, the elapsed time Td elapsed from the time point at which the rising edge of the displacement signal (EN_D) has appeared until the TG signal is generated and inputted corresponds to a time obtained by adding the elapsed time Tc of the embodiment with the time Te.

Further, the present teaching is not limited to the embodiment and modification described above, and may be modified to have a variety of kinds of aspects. For example, the line sensor 21 may be any of a monochrome image sensor and a color image sensor. In a case that a color image sensor is adopted as the line sensor 21, the reading control section 45 may be configured to input, to the line sensor 21, a control signal based on TG signals for generating line image data of three colors (red, green, blue).

In a case of adopting the color image sensor as the line sensor 21, as another example, the image reading apparatus 1 may be configured as follows. Namely, the period T0 of the TG signal is set to be a value which is shorter to a little extent than a value that is ⅓ times the appearance time interval TE of the rising edge of the displacement signal (EN_D) corresponding to the constant target velocity Vc. Further, every time the TG signal is inputted, the reading control unit 45 inputs a lighting control signal (SG2) corresponding to one of the red, green and blue colors to the line sensor 21 so that the respective light sources of red, green and blue colors are successively lighted ON.

Figure 10:
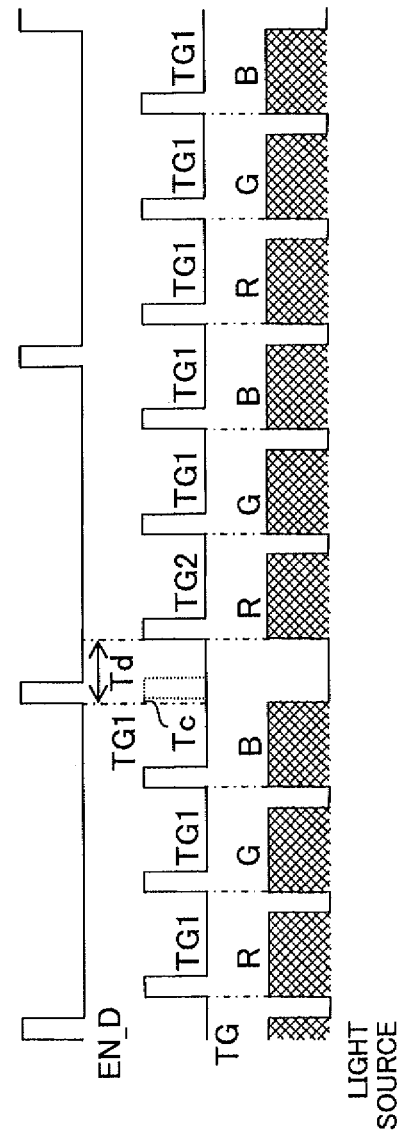
FIG. 10 is a time chart indicating a waveform of a TG signal in a case of performing a color image reading operation.

On the other hand, regarding the three TG signals by which the reading operations for the red, green and blue colors are started, the timing control section 43 performs adjustment for a TG signal, by which the reading operation for a first color (red color) is started, so that the input timing of this TG signal for the first color is adjusted as depicted in FIG. 10, in a similar manner as in the embodiment described above. In the third stage of FIG. 10, reference sign "R" indicates that the red light source is lighted ON, reference sign "G" indicates that the green light source is lighted ON, and reference sign "B" indicates that the blue light source is lighted ON. According to this adjustment, even in an image recording apparatus provided with the color image sensor as the line sensor, read-image data with an excellent image quality can be generated.

In addition, the embodiment has been explained with the example in which the line sensor 21 is conveyed in a state that the original Q is fixed to thereby change the relative position between the line sensor 21 and the original Q in the sub scanning direction, and another example in which the original Q is conveyed in a state that the line sensor 21 is fixed to thereby change the relative position between the original Q and the line sensor 21 in the sub scanning direction. However, the technical idea of the embodiment is applicable also to an image reading apparatus which conveys both of the line sensor and the original to thereby change the relative position between the original Q and the line sensor in the sub scanning direction.

Further, the processing executed by the timing control section 43 for generating the TG signal, and for adjusting the input timing of the TG signal and the processing executed by the motor control section 41, etc. may be realized by a hardware or by a software, or a combination of the hardware and software.

Finally, the correspondence in the present teaching is provided as follows. The line sensor 21 corresponds to an example of the reading unit. The line sensor conveying mechanism 23, the original-conveying mechanism 31, the FB motor 25, the ADF motor 35, the driving circuit 27, 37 and the motor control section 41 correspond to an example of the conveying unit.

In addition, the FB encoder 29, the ADF encoder 39, the encoder process section 42 and the frequency divider 431 correspond to an example of the signal output unit. The reference signal-generating section 432 and the first TG signal-generating section 435 correspond to an example of the command unit, the counter 433, the comparator 434, the second TG signal-generating section 436, 446 and the TG selecting section 438 (and the reading control section 45) correspond to an example of the control unit. The TG signal and the line start signal (SG1) correspond to an example of the command signal.

What is claimed is:
1. An image reading apparatus comprising:
a command unit configured to generate a command signal periodically;
a reading unit configured to read an original in a main scanning direction in accordance with the command signal every time the command signal is generated;
a conveying unit configured to perform a conveying process for conveying at least one of the reading unit and the original so as to change a relative position between the reading unit and the original in a sub scanning direction;
a signal output unit configured to output a displacement signal every time the relative position is changed by a predetermined reading interval; and
a control unit configured to control a generation timing at which the command signal is generated by the command unit,
wherein a generation period of the command signal is less than an output time interval at which the displacement signal is outputted by the signal output unit in the conveying process,
the control unit is configured to determine, with respect to the command signal periodically generated, an elapsed time elapsed from an output timing at which the displacement signal has been outputted by the signal output unit until a generation timing at which the command signal is generated by the command unit after the displacement signal has been outputted, and
under a condition that the elapsed time is less than a reference value, the control unit delays generating the command signal until the elapsed time is not less than the reference value.

2. The image reading apparatus according to claim 1, wherein under a condition that the elapsed time is less than the reference value, the control unit controls the command unit to generate the command signal at a timing when the elapsed time is greater than the reference value.

3. The image reading apparatus according to claim 1, wherein under a condition that the elapsed time is less than the reference value, the control unit controls the command unit to delay the generation timing of the command signal, by a predetermined time, from the generation timing adopted under a condition that the command signal is generated periodically.

4. The image reading apparatus according to claim 1, wherein the control unit delays generating the command signal under a condition that the elapsed time is less than the reference value in a high-velocity conveyance segment included in the conveying process, the output time interval of the displacement signal being less than twice the generation period of the command signal in the high-velocity conveyance segment.

5. The image reading apparatus according to claim 1,
wherein the conveying process includes an acceleration segment in which relative velocity between the original and the reading unit is accelerated to a predetermined velocity, a constant velocity segment in which the relative velocity is controlled to be the predetermined velocity, and a deceleration segment in which the relative velocity is decelerated from the predetermined velocity, and
the control unit delays generating the command signal under a condition that the elapsed time is less than the reference value in the constant velocity segment.

6. The image reading apparatus according to claim 5, wherein the reference value is determined to be not more than difference between the output time interval of the displacement signal and the generation period of the command signal in the constant velocity segment.

7. The image reading apparatus according to claim 6, wherein under a condition that the elapsed time is less than the reference value, the control unit delays generating the command signal until the elapsed time is not less than the reference value and is more than twice the difference between the output time interval of the displacement signal and the generation period of the command signal in the constant velocity segment.

8. The image reading apparatus according to claim 5, wherein under a condition that the elapsed time is less than the reference value, the control unit delays generating the command signal until the elapsed time is not less than the reference value and is not more than ½ times the output time interval of the displacement signal in the constant velocity segment.

* * * * *